(12) United States Patent
Izumo

(10) Patent No.: US 10,375,933 B2
(45) Date of Patent: Aug. 13, 2019

(54) ANIMAL BEHAVIOR MONITORING SYSTEM

(71) Applicant: A&D COMPANY, LIMITED, Tokyo (JP)

(72) Inventor: Naoto Izumo, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 210 days.

(21) Appl. No.: 15/526,238

(22) PCT Filed: Dec. 12, 2014

(86) PCT No.: PCT/JP2014/082984
§ 371 (c)(1),
(2) Date: May 11, 2017

(87) PCT Pub. No.: WO2016/092699
PCT Pub. Date: Jun. 16, 2016

(65) Prior Publication Data
US 2017/0367304 A1    Dec. 28, 2017

(51) Int. Cl.
*A01K 1/03*        (2006.01)
*A01K 29/00*      (2006.01)
(Continued)

(52) U.S. Cl.
CPC .............. *A01K 29/005* (2013.01); *A01K 1/03* (2013.01); *A01K 1/031* (2013.01); *G01G 17/08* (2013.01);
(Continued)

(58) Field of Classification Search
CPC .................................. A01K 1/03; A01K 1/031
(Continued)

(56) References Cited

U.S. PATENT DOCUMENTS 5,355,833 A * 10/1994 Legrain .................... A01K 9/00
                                                                119/51.02
6,405,672 B1 * 6/2002 De Mol .................. A01K 29/00
                                                                 119/14.14
(Continued)

FOREIGN PATENT DOCUMENTS

JP       07-019944 A      9/1999
JP       11-266459 A      9/1999
(Continued)

OTHER PUBLICATIONS

International Search Report and Written Opinion dated Mar. 17, 2015 in the corresponding application PCT/JP2014/082984.

*Primary Examiner* — David J Parsley
(74) *Attorney, Agent, or Firm* — Roberts Mlotkowski Safran Cole & Calderon P.C.

(57) ABSTRACT

Provided is a system for observing and analyzing an animal behavior by utilizing a balance. The animal behavior observation system includes an animal container where an animal move around, a weight measuring apparatus that has a weight detecting unit for obtaining measurement data of the animal on the animal container, an analyzing device enabling calculation of a measurement value in accordance with the measurement data, a recording device that constantly stores the measurement value; and an output device that outputs the measurement value along a time axis.

6 Claims, 10 Drawing Sheets

(51) Int. Cl.
 *G01G 19/02* (2006.01)
 *G01G 19/414* (2006.01)
 *G01G 17/08* (2006.01)

(52) U.S. Cl.
 CPC ......... *G01G 19/021* (2013.01); *G01G 19/414* (2013.01)

(58) Field of Classification Search
 USPC ................................................ 119/417, 421
 See application file for complete search history.

(56) References Cited

U.S. PATENT DOCUMENTS

| | | | | |
|---|---|---|---|---|
| 8,797,166 | B2 * | 8/2014 | Triener | G01G 17/08 340/573.1 |
| 8,866,605 | B2 * | 10/2014 | Gibson | A01K 11/006 340/539.1 |
| 2003/0024482 | A1 * | 2/2003 | Gondhalekar | A01K 1/031 119/417 |
| 2007/0288249 | A1 * | 12/2007 | Rowe | A01K 1/0023 705/7.11 |
| 2013/0255586 | A1 * | 10/2013 | Gerashchenko | A01K 29/005 119/421 |

FOREIGN PATENT DOCUMENTS

| | | |
|---|---|---|
| JP | 2002-65109 A | 3/2002 |
| JP | 2003-199457 A | 7/2003 |
| JP | 2004-113011 A | 4/2004 |
| JP | 2009-2715 A | 1/2009 |
| JP | 2013-240318 A | 12/2013 |

\* cited by examiner

Fig. 9
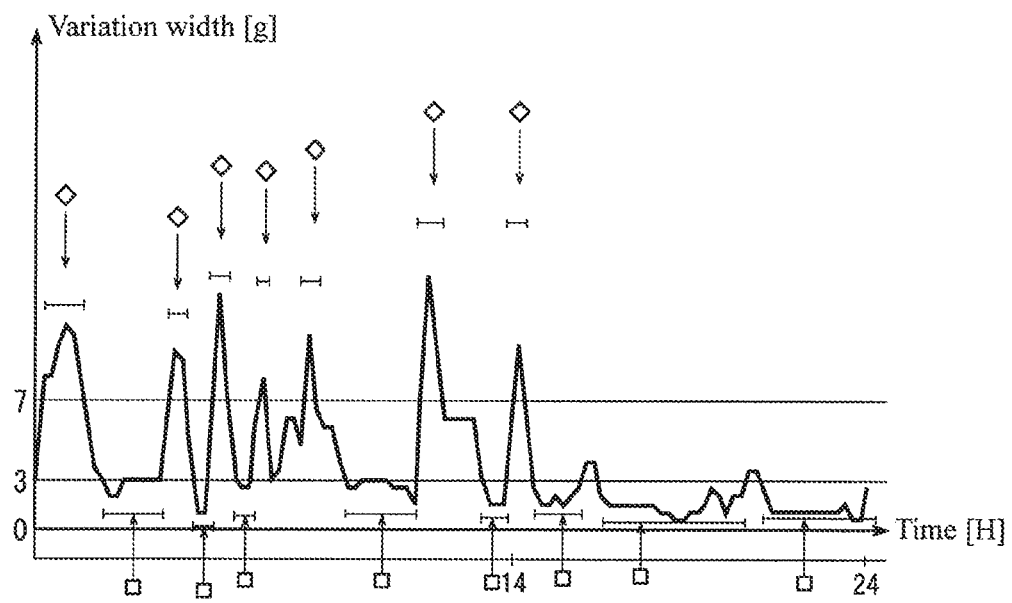
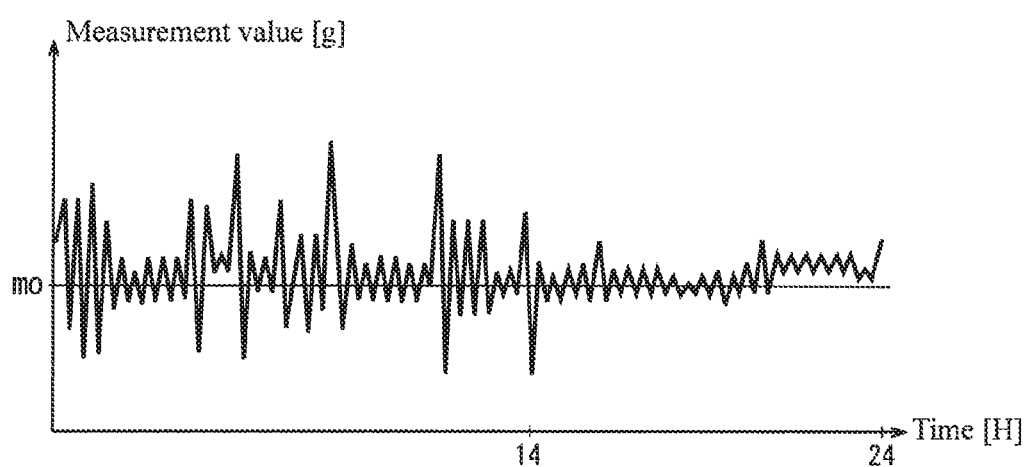
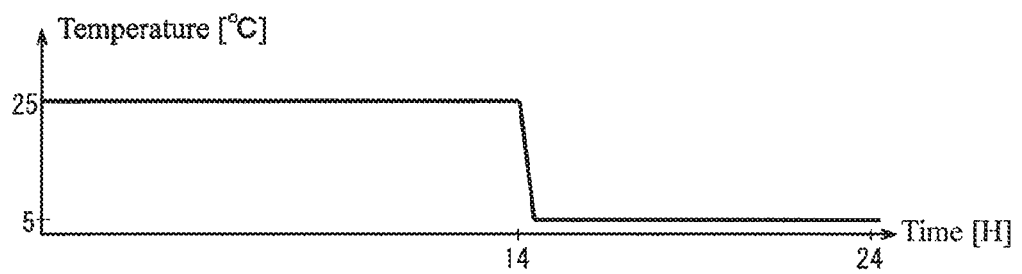

ANIMAL BEHAVIOR MONITORING SYSTEM

The present application is a U.S. National Phase of PCT/JP2014/082984 filed on Dec. 12, 2014. The disclosure of the PCT Application is hereby incorporated by reference into the present Application.

TECHNICAL FIELD

The invention relates to a system for observing and/or analyzing animal behavior by utilizing a weight measuring apparatus such as a balance.

BACKGROUND ART

Various apparatus for an animal experiment have been planned, produced, and used. As a weight measuring apparatus, a balance has historically used in the animal experiment to measure weight of an animal. During measurement of the weight of the animal, measurement data of the animal changes constantly due to action of the animal, a measurement value (a displayed value) cannot be obtained stably, so that a balance for the animal experiment is adjusted to remove a bias placement error as long as possible so as to obtain the same measurement value wherever the animal stays. This adjustment is generally conducted by adjusting height of a Roberval mechanism, or a data processing. For example, a balance disclosed in Patent Literature 1 is widened its stable width for stopping or allowing its data loading of the measurement value by judging a state of data in activity or stability when the measurement data is averaged, thus, a data processing of the balance is stronger than a general data processing against vibration.

Meanwhile, in view of an animal protection and reduction of costs regarding the animal experiment, in a recent animal experiment, an experiment for observing the animal behavior due to influence of a mental illness and a genetic element is conducted instead of a typical method such as a direct method including a dissection. In this observation, it is important that how accurately the animal behavior or action can be measured and evaluated. For this, an image analyzing method by shooting with a CCD camera for a long stretch of time is conducted to analyze a moving distance per unit time, a movement of animal limbs at a constant position, moving area, or a destination point of the animal (refer to Patent Literature 2).

CITATION LIST

Patent Literatures

Patent Literature 1: JPA H07-19944
Patent Literature 2: JPA H11-266459

SUMMARY OF THE INVENTION

Technical Problem

However, in such observation by use of the CCD camera, it is difficult that the data shot by the camera for a long time are converted into numerical values, so that any data processing method has not been established.

An object of the present invention is to provide a system enabling observation and analysis of animal behavior by utilizing a balance instead of a camera as a means enabling observation with more precision and in detail.

Solution to Problem

To solve the problems above, an observation system of animal behavior according to an aspect of the present invention includes: an animal container where an animal move around; a weight measuring apparatus that has a weight detecting unit for obtaining measurement data of the animal on the animal container; an analyzing device enabling calculation of a measurement value in accordance with the measurement data; a recording device that constantly stores the measurement value; and an output device that outputs the measurement value along a time axis.

In the aspect described above, it is also preferable that the observation system further comprises a disturbance generating device that give a disturbance to the animal on the animal container.

In the aspect described above, it is also preferable that an environmental sensor for measuring observation environment is disposed inside, outside, or around the animal container, the recording device constantly stores the measurement value and an environmental value of the environmental sensor, and the output device outputs the measurement value with the environmental value along a time axis.

In the aspect described above, it is also preferable that the analyzing device calculates a variation width of the measurement value per unit time.

In the aspect described above, it is also preferable that the analyzing device analyzes activity state of the animal in view of a dimension of the variation width.

In the aspect described above, it is also preferable that the analyzing device counts a frequency that the variation width is equal to or greater than a set threshold, and analyzes an activity pattern of the animal based on the frequency.

In the aspect described above, it is also preferable that the recording device stores the variation width of the measurement value, and the output device outputs the variation width with the environmental value along a time axis.

In the aspect described above, it is also preferable that the recording device stores the frequency of the variation width of the measurement value, and the output device outputs the frequency with the environmental value along a time axis.

Effects of Invention

The observation system of animal behavior according to the present invention takes the place of an observation utilizing the camera, and enables observation and analysis of the animal behavior by detecting a change of the measurement data in accordance with slight or dynamic vibration due to action and movement of the animal while using a balance.

BRIEF DESCRIPTION OF DRAWINGS

FIG. 9 illustrates an example of output of the analyzing of the system in FIG. 1.

DESCRIPTION OF EMBODIMENTS

Next, Preferred embodiments of the present invention are described with reference to the drawings.

Figure 1:
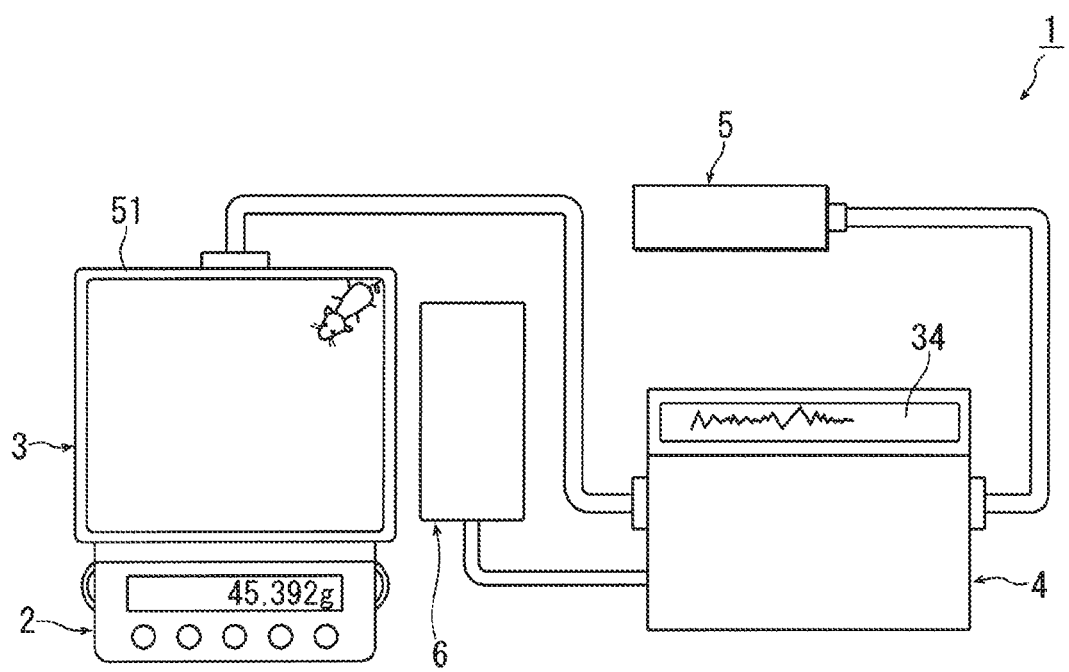
FIG. 1 illustrates a system configuration of an observation system of animal behavior in accordance with an embodiment of the present invention.

FIG. 1 illustrates a system configuration of an observation system of animal behavior in accordance with the embodiment. The observation system of animal behavior in accordance with the embodiment (hereinafter, this is simply called "system 1") includes a balance 2, an animal container 3, an arithmetic processing device 4, an environmental sensor unit 5, and a disturbance generating device 6.

Figure 2:
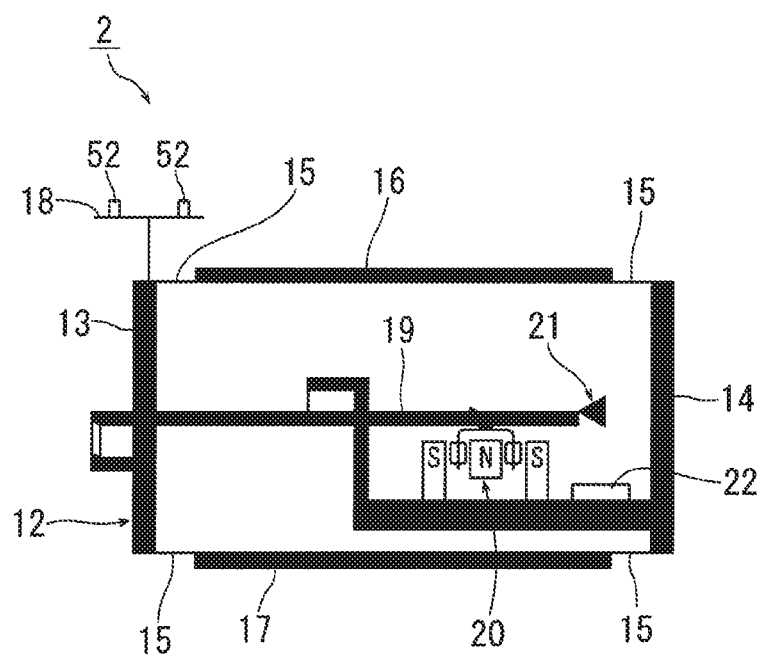
FIG. 2 illustrates a configuration of a balance in FIG. 1.

As the balance 2 (weight measuring apparatus), an electromagnetic balance type electronic balance is preferable though the reason is described later. A configuration of the electromagnetic balance type electro balance is shown in FIG. 2.

The electromagnetic type balance 2 has a Roberval mechanism 12 which acts as a load transmission mechanism. The Roberval mechanism 12 includes a columnar floating frame 13 which receives a load, a fixing frame 14 fixed to a case of the balance, and a pair of an upper sub-frame 16 and a lower sub-frame 17 which connect between the floating frame 13 and the fixing frame 14 via hinges 15. A pan receiving part 18 is fixed to an upper surface of the floating frame 13. A load applied to the pan receiving part 18 is transmitted to a beam 19 connected to the floating frame 13 via two suspension bands. An electromagnetic unit 20 is disposed at the fixing frame 14. The electromagnetic unit 20 includes a yoke, a permanent magnet equipped with a magnet disposed in the yoke, and a driving coil disposed around the magnet. The driving coil is fixed to the beam 19. A photoelectric position sensor 21 is disposed at a tip end of the beam 19. When the beam 19 is displaced due to the load, an electric current flows in the driving coil of the electromagnetic unit 20 so as to maintain its horizontality (parallelism). The current is converted to voltage, the voltage is A/D converted, and digitized as measurement data. The measurement data is converted to a measurement value via a microprocessor 22. The beam 19, the electromagnetic unit 20, the position sensor 21, and the microprocessor 22 act as a weight detecting unit. These measurement values are sent to the arithmetic processing device 4 via an RS-232C interface.

Figure 3:
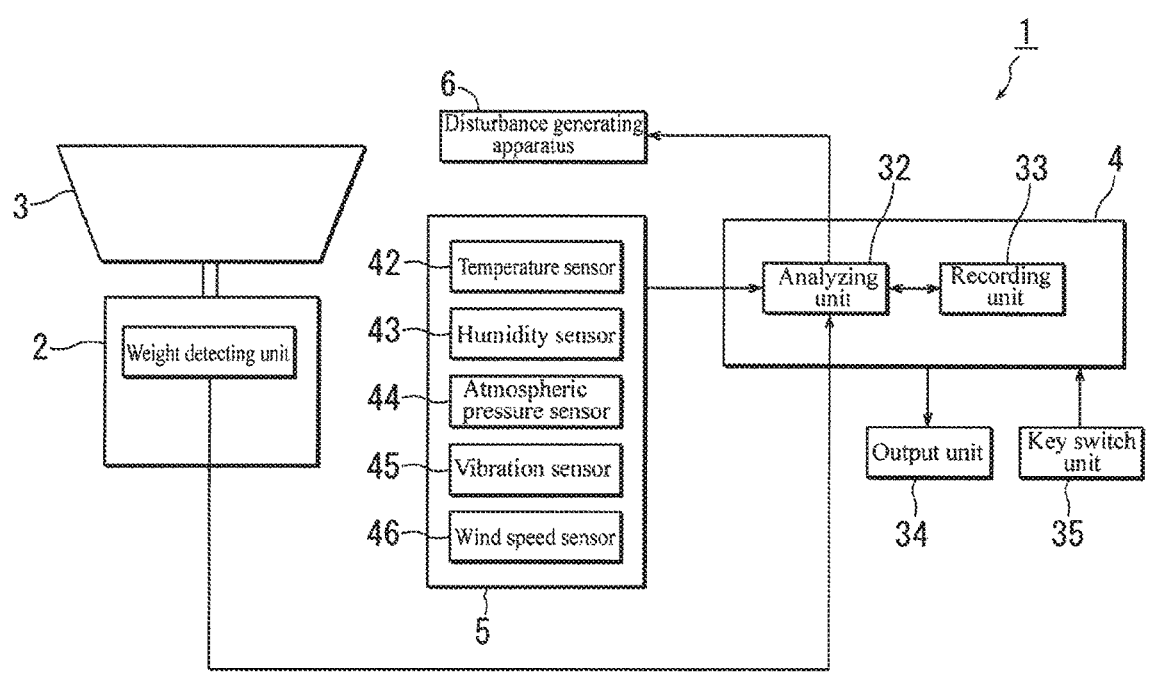
FIG. 3 is a block diagram showing a functional configuration of the system in FIG. 1.

FIG. 3 is a block diagram of a functional configuration of the system in FIG. 1. As shown in FIG. 3, the arithmetic processing device 4 may be configured with any general-purpose devices as long as the device includes (or can be connected to) an analyzing unit (analyzing device) 32, a recording unit (recording device) 33, and an output unit (output device) 34, such as a personal computer. The analyzing unit 32 has a CPU, a ROM, and a RAM, generates several command signals, and operates processing of a measurement value described later. The recording unit 33 has a magnetic hard disk or a semiconductor memory, and stores the measurement value and values calculated by the analyzing unit 32. The output unit 34 is a monitor screen. A key switch unit 35 is connected to the arithmetic processing device 4, and an experimentalist can input each setting and instruction of each disturbance. The balance 2, the environmental sensor unit 5, and the disturbance generating apparatus 6 are connected to the arithmetic processing device 4.

The environmental sensor unit (environmental sensor) 5 accommodates an electronic board equipped with a temperature sensor 42, a humidity sensor 43, an atmospheric pressure sensor 44, a vibration sensor 45, and a wind speed sensor 46 in a housing having a required size, and is disposed inside, outside, or around the animal container 3. Environmental data obtained by the environmental sensor unit 5 is digitized, and sent to the arithmetic processing device 4 via a communication cable. The environmental sensor unit 5 may be configured as a unit including another sensor, for example, a water thermometer disposed at a water server. The environmental sensor unit 5 is used in order to measure environment of disturbance and confirm a background of an experiment. Preferably, for a long stretch experiment and analyzing work after the experiment, the environmental sensor unit 5 is configured so as to measure and store the environmental data simultaneously as much as possible.

The disturbance generating apparatus 6 (disturbance generating device) is configured with at least one of or combination among; a heating/cooling device, a humidifier/dehumidifier device, a decompression device/an air blow device, a light emitting/blocking device, a liquid ejecting device, an electric stimulation device, an odor generating device, a sound generating device, a vibration generating device, a device which makes the animal contact with an object, a feeding device, a water server system, and any devices for a behavior test having a mental and physical influence on the animal. In FIG. 1, the disturbance generating apparatus 6 is illustrated as single housing which accommodates any devices among the above described devices, however, the apparatus may be configured with a plurality of housings, disposed (wiring) inside the animal container 3, or directly attached on the animal in accordance with a kind of the disturbance. In addition, the disturbance generating apparatus 6 may be any devices which can bring a factor enabling entrance into the animal's sensibility, and may be configured with any general-purpose devices in accordance with knowledge of a skilled technician. Output from the disturbance generating apparatus 6 has a function which gives an external stimulation to an object animal (mouse or rat) in the animal container. The disturbance generating apparatus 6 is configured so as to be controlled its on/off by a command signal from the arithmetic processing device 4.

The animal container 3 is not a weighting pan widely used for a balance but a pan which has area where the animal move around in accordance with an open-field-test, and preferred outer walls 51 are formed on an outer peripheral of the pan so as to prevent the animal escaping. More preferably, the outer walls 51 are made of a soft material which never hurts the object animal, and inner peripherals of the walls have no projection or the like, and are smoothly connected to each other.

The animal container 3 is disposed on an upper surface of the pan receiving part 18. The animal container 3 has, for example, at a lower surface thereof, a concave portion which is engaged with a rotation-locking boss 52 (refer to FIG. 2)

formed on the pan receiving part 18, and is disposed on the pan receiving part 18 with a convex-concave locking.

Figure 4:
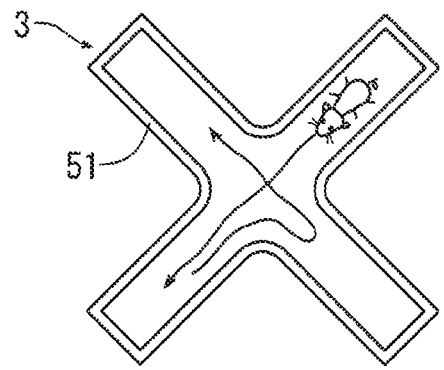
FIG. 4(a) illustrates a modification of an animal container in FIG. 1.
FIG. 4(b) illustrates an alternative modification of the animal container in FIG. 1.
FIG. 4(c) illustrates a further alternative modification of the animal container in FIG. 1.
FIG. 4(d) illustrates a still further alternative modification of the animal container in FIG. 1.
Figure 4:
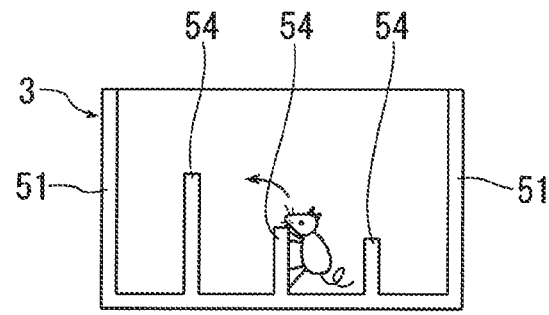
Figure 4:
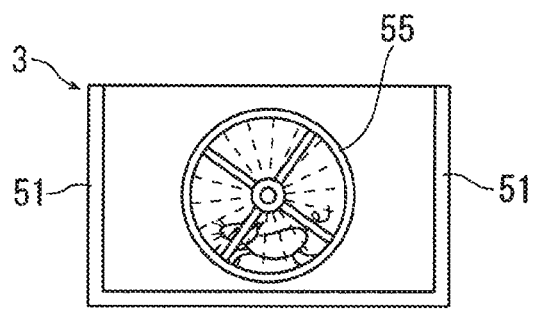
Figure 4:
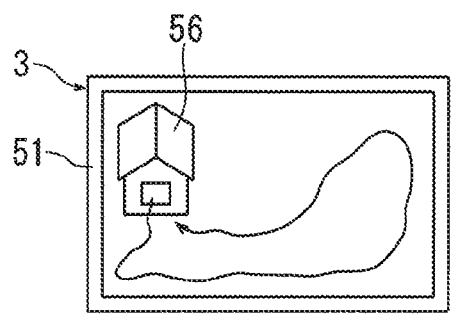

FIG. 4 illustrates modifications of the animal container 3 in FIG. 1. The animal container 3 has variations in accordance with an experiment purpose. Examples are shown in FIG. 4.

FIG. 4(a) is a top view of a modification of the animal container 3. The animal container 3 shown in FIG. 4(a) has a substantially "X" shape, and detects change of a measurement value due to a movement of the center of gravity of the animal.

FIG. 4(b) is a vertical cross section of an alternative modification of the animal container 3. The animal container 3 shown in FIG. 4(b) is equipped with a plurality of walls 54 each extending vertically in stages in the case, and detects change of acceleration when the animal jumps across the walls 54.

FIG. 4(c) is a vertical cross section of a further alternative modification of the animal container 3. In the animal container 3 shown in FIG. 4 (c), a running wheel 55 is disposed, a change of acceleration when the animal exercises with the running wheel 55 is detected as a change of a measurement value.

By using the animal containers 3 shown in FIGS. 4(a) to 4(c), observation and/or analysis data in reference to activity of the animal can be obtained.

FIG. 4(d) is a top view of a still further alternative modification of the animal container 3. In the animal container 3 shown in FIG. 4(d), a black box 56 is disposed. Between time when the animal stays inside the black box 56 and time when the animal acts outside the black box 56, a difference of a change amount of measurement data is seen in accordance with a dimension and a frequency of the movement of the center of gravity, so that data for evaluating an uneasy mentality state of the animal is obtained by utilizing the black box 56. As the animal container 3 for evaluating the uneasy mentality state, opening and closing each of the animal containers 3 of FIGS. 4(a) to 4(c) with a lid may be conducted. The animal container 3 may be preferably modified so as to achieve an object of the experiment.

Figure 5:
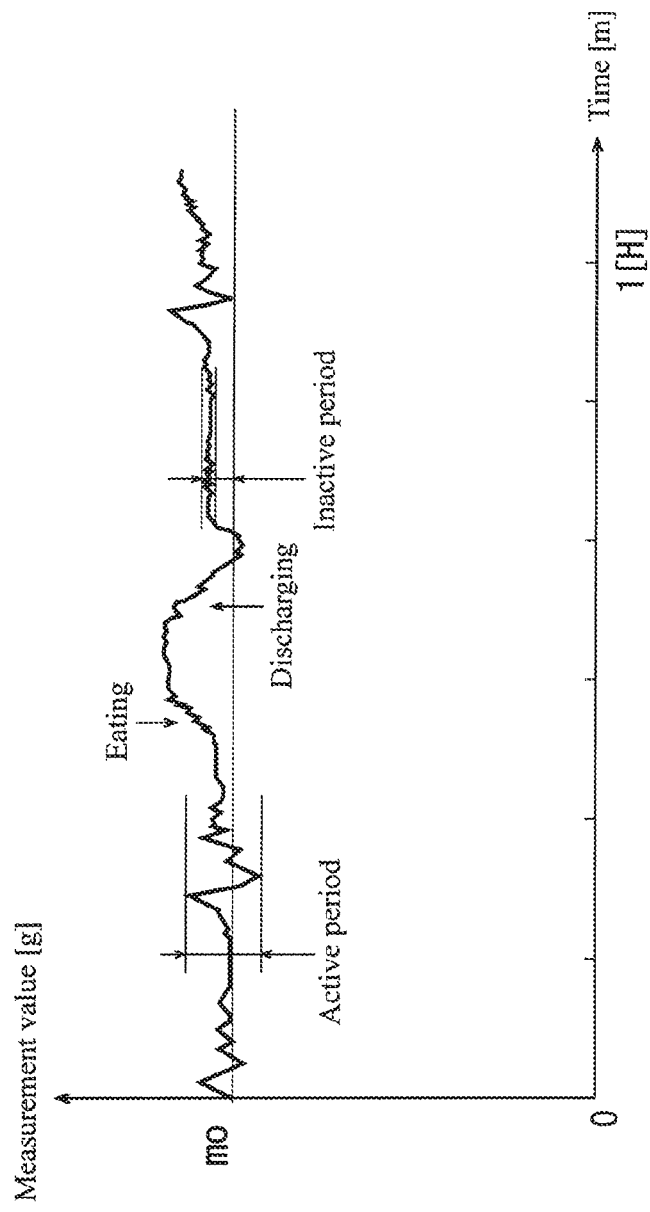
FIG. 5 illustrates an example of output of the system in FIG. 1.

From the above described configuration, the system 1 enables observation of animal behavior based on a change of measurement value due to a movement (movement of the center of gravity) of the animal on the animal container 3. FIG. 5 illustrates an example of output of the system in FIG. 1. Details are described with reference to FIG. 5 and FIG. 6.

FIG. 5 is an output image that a measuring value outputted from the balance 2 at every moment (once per 20 seconds, by way of example) during a certain period necessary for analysis of results for one hour from the start of the experiment are plotted on a graph, wherein the x-axis represents a time axis and the y-axis represents the measurement value. In the experiment of FIG. 5, the animal container 3 having the shape shown in FIG. 1 was used, a mouse which has an initial weight M0 [g] was put into the case 3 and was fed with the disturbance generating apparatus 6 after 25 minutes from the start of the experiment. Interval of obtaining the measurement value may be set preferably in consideration of type of the experiment, time length of the experiment, and a species and individual difference of the animal.

According to the graph of FIG. 5, after 10 to 20 minutes from the start of the experiment, a dynamic change of the measurement value was seen, thus, it seems that the animal had been moving actively. After 25 to 30 minutes from the start, the change of the measurement value was slight but the measurement value increased, thus, it seems that the animal ate at a constant position. After 35 to 40 minutes from the start, the change of the measurement value was slight but the measurement value reduced, thus, it seems that the animal discharged at a constant position. After 40 to 50 minutes from the start, the change of the measurement value was continuously slight, thus, it seems that the animal took a rest. In this manner, animal behavior is observed from a change of measurement value.

Figure 6:
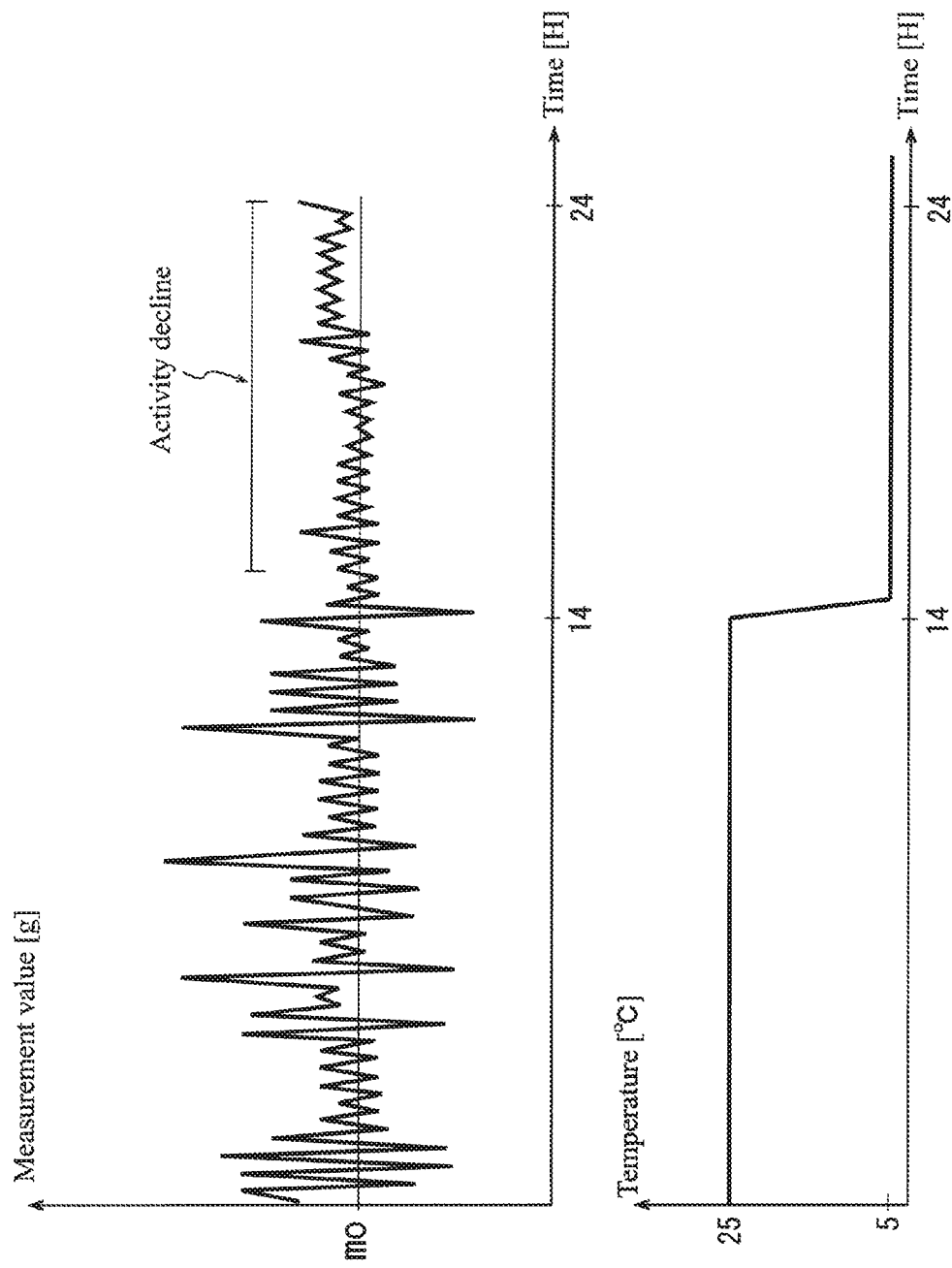
FIG. 6 illustrates an alternative example of output of the system in FIG. 1.

FIG. 6 is an output image that a measuring value outputted from the balance 2 at every moment (once per 20 seconds, by way of example) during a certain period necessary for analysis of results for 24 hours from the start of the experiment are plotted on a graph, wherein the x-axis represents a time axis, the lower y-axis represents the environmental (temperature) value (once per 20 seconds, by way of example), and the upper y-axis represents the measurement value. While FIG. 6 shows the measurement value and the environmental value parallelly in upper-lower stages by way of example, the data may be shown in right-left stages or diagonal stages of each other, and shown overlapped in the same graph. In the experiment of FIG. 6, the animal container 3 having the shape shown in FIG. 1 was used, the environmental sensor unit 5 was disposed at neighboring and above the animal container 3. The temperature in the animal container 3 (temperature in a laboratory) was started under fixed condition at 25 degrees Celsius, and then, after 14 hours, the animal container 3 was surrounded by a clear case and a cold wave at a temperature of 5 degrees Celsius was flowed in the case from the disturbance generating apparatus 6.

According to the graph of FIG. 6, until 14 hours from the start of the experiment, the animal had acted as usual, however, after temperature falling, it seems that its activation was reduced. In this manner, outputting a change of measurement value with a change of temperature value enables observation of behavior change of the animal due to the disturbance, and enables verification influence of the disturbance.

Figure 7:
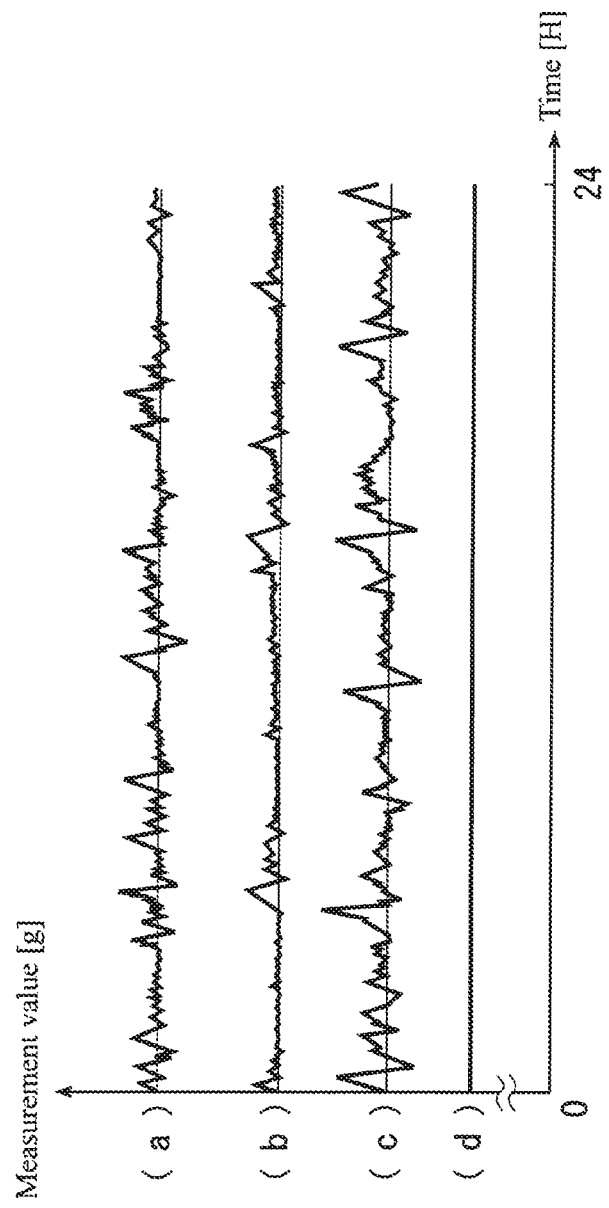
FIG. 7 illustrates a further alternative example of output of the system in FIG. 1.

Next, FIG. 7 illustrates a further alternative example of output of the system in FIG. 1, and shows typical examples of several activity-state patterns. Graphs (a) to (d) in FIG. 7 each has an x-axis representing time axis and a y-axis representing a measurement value, and are graphed during 24 hours from a start of the experiment. Graph (a) is an ordinary activity pattern, Graph (b) is a slow movement pattern, Graph (c) is an excitement activity pattern, and Graph (d) is a dead pattern. Behavior of the animal tends to as follows, active periods and inactive periods are appeared in a cycle in the ordinary activity pattern, inactive periods are seen frequently in the slow movement pattern, active periods are seen frequently in the excitement activity pattern, and a change of measurement value is not seen in the dead pattern.

Figure 8:
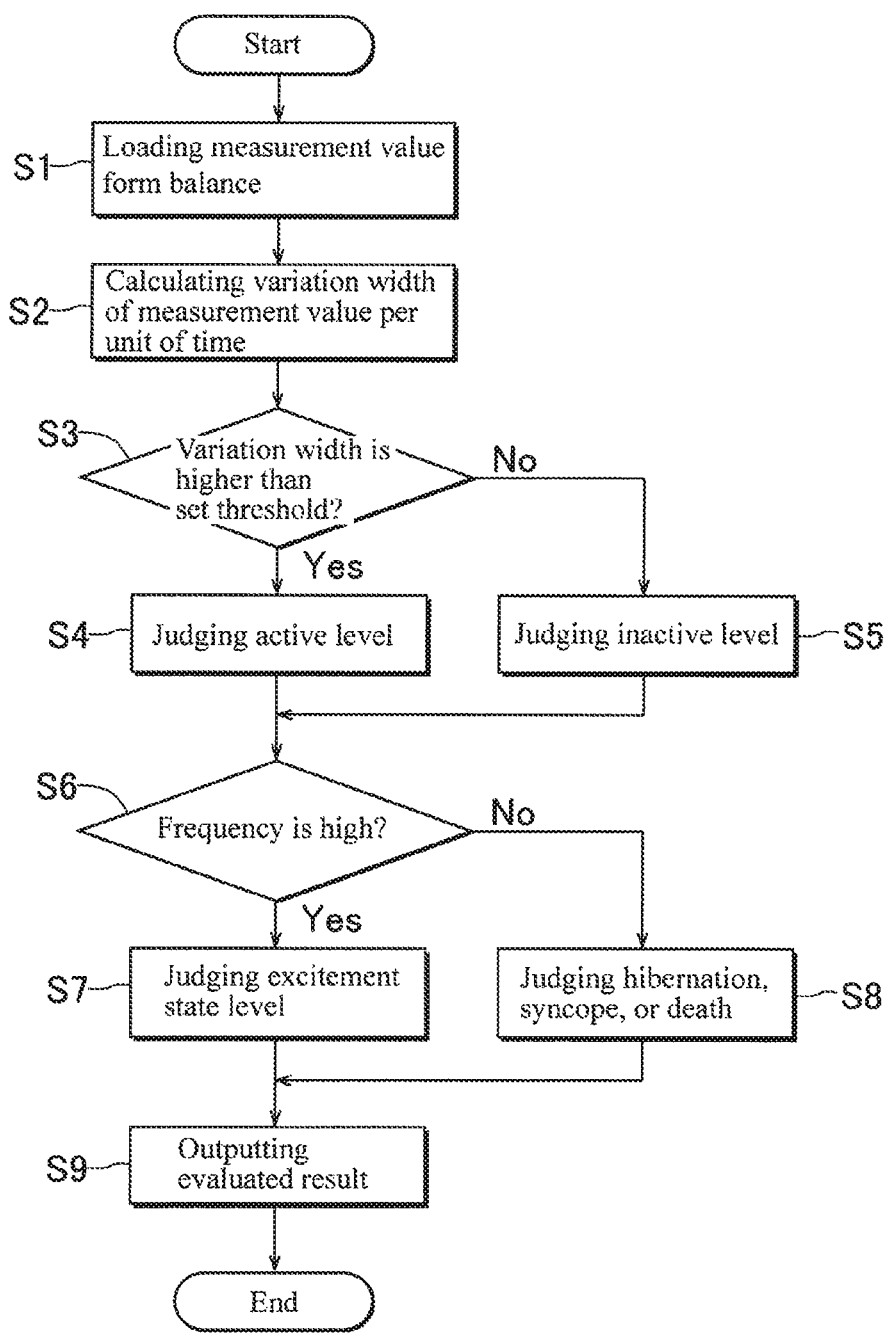
FIG. 8 is a flow chart for behavior analyzing.

The system 1 of the present embodiment conducts a pattern analyzing in reference to the above activity-state patterns by arithmetic processing the measurement value. FIG. 8 is a flow chart for behavior analyzing.

The system 1 takes measurement value of the balance 2 into the arithmetic processing device 4 from a start of the experiment in Step S1. Next, the process advances to Step S2, the analyzing unit 32 calculates a variation width of the measurement value per unit of time. Said variation width is a difference between M1 and M2 when a measurement value at an obtaining time T1 is the M1 [g], a measurement value at an obtaining time T2 is the M2 [g] by way of example. Basically, the difference between M1 and M2 is an absolute value. However, regarding a zero point, it is known that a vibration generated due to an environmental factor is larger than its span value (weight amount (absolute value)–zero point change), so that it is considerable that only a difference from a prior measurement value is set its analysis object in order to cancel a change of the zero point, especially, in a long stretch observation and analysis.

The unit time is set same as the interval of obtaining the measurement value, or, set arbitrarily in accordance with a type of the experiment and time length of the experiment. In the unit time setting, the observation animal's age, male/female classification, or speed of a movement of the center of gravity judged from a kind of the disturbance are considered.

Next, in Step S3, the variation width is compared with set thresholds. The thresholds are preset and include a threshold for judging an active period and a threshold for judging an inactive period. When the variation width is equal to or greater than the threshold for judging the active period, the process advances to Step S4, and this period is judged as the active period. A plurality of thresholds for judging the active period may be set to analyze an activity level in more detail. On the other hand, when the variation width is equal to or less than the threshold for judging the inactive period, the process advances to Step S5, this period is judged as the inactive period. A plurality of thresholds for judging the inactive period may be set to analyze a distinction of sleeping or rest. The thresholds may be set in accordance with a type of the experiment, time length of the experiment, or an experimental rule, and may be corrected arbitrarily in accordance with an individual difference of the animal.

Next, the process advances to Step S6, a frequency which the variation width is equal to or greater than the set threshold is counted, and then, whether the frequency is high or not is judged. The value for judging high frequency may be set in accordance with a type of the experiment, time length of the experiment, or an experimental knowledge, and may be corrected arbitrarily in accordance with an individual difference of the animal. The frequency which the variation width is equal to or greater than the threshold for judging the active period is high, the process advances to Step S7, it is judged that an excitement state is continued due to the disturbance. In this case, also, the excitement state level may be divided more specifically in accordance with the frequency. On the other hand, a frequency that the variation width is equal to or greater than the threshold for judging the inactive period is low, the process advances to Step S8, it is judged that an immotile state is occurred physically and/or spiritually. The judgement may analyze a distinction of the animal's hibernation, syncope or death in accordance with the frequency.

Next, the process advances to Step S9, results of the judgement are outputted. The results may be outputted as a notice with a mark such as arrows on the graph shown in FIG. 5, outputted on the time axis with a notice, or depicted on a white space of the graph with time information, and also the results may be outputted so as to be distinguished its coloring shown in FIG. 6. Furthermore, the results may be noticed to the experimentalist by emitting sound or light during the experiment.

Next, FIG. 9 illustrates an example of output of the analyzing of the system in FIG. 1. FIG. 9 relates to the same experiment of FIG. 6, and the x-axis represents a time axis. The environmental values represented in the lower y-axis and the measurement values represented in the middle y-axis are the same of FIG. 6. The upper y-axis represents a variation width of the measurement value in the middle y-axis. A unit time for arithmetic processing is set 10 minutes by way of example, but it may be set smaller unit, such as a second.

According to the graph in FIG. 9, calculating the variation width can simply found the animal's state that its activity is reduced after the temperature falling. Also, regarding the observation animal (initial weight: 30 [g]), in the case where the threshold for judging the active period is 7 [g] or more, and the threshold for judging the inactive period is 3 or less [g], the periods shown by arrows with diamond marks are judged as active periods and the periods shown by arrows with square marks are judged as inactive periods, so that change of activity can be analyzed quantitatively. These thresholds may be set any time either one of before the experiment, in the experiment, after the experiment, or in its analysis time. Also, the thresholds may be corrected arbitrarily in accordance with a type of the experiment, time length of the experiment, or an individual difference of the animal, however, according to an experimental knowledge, in evaluating its ordinary state, the threshold is set to 10 to 50% of weight of the observation animal (the weight is based on its initial weight, however, correcting due to time course and the disturbance may be allowed), in evaluating its excitement state which is beyond the ordinary condition, the threshold is set to 100% of the weight, and in its rest state, the threshold is set to 1 to 10% of the weight, thus, using a weight ratio of the observation animal is preferable.

Figure 10:
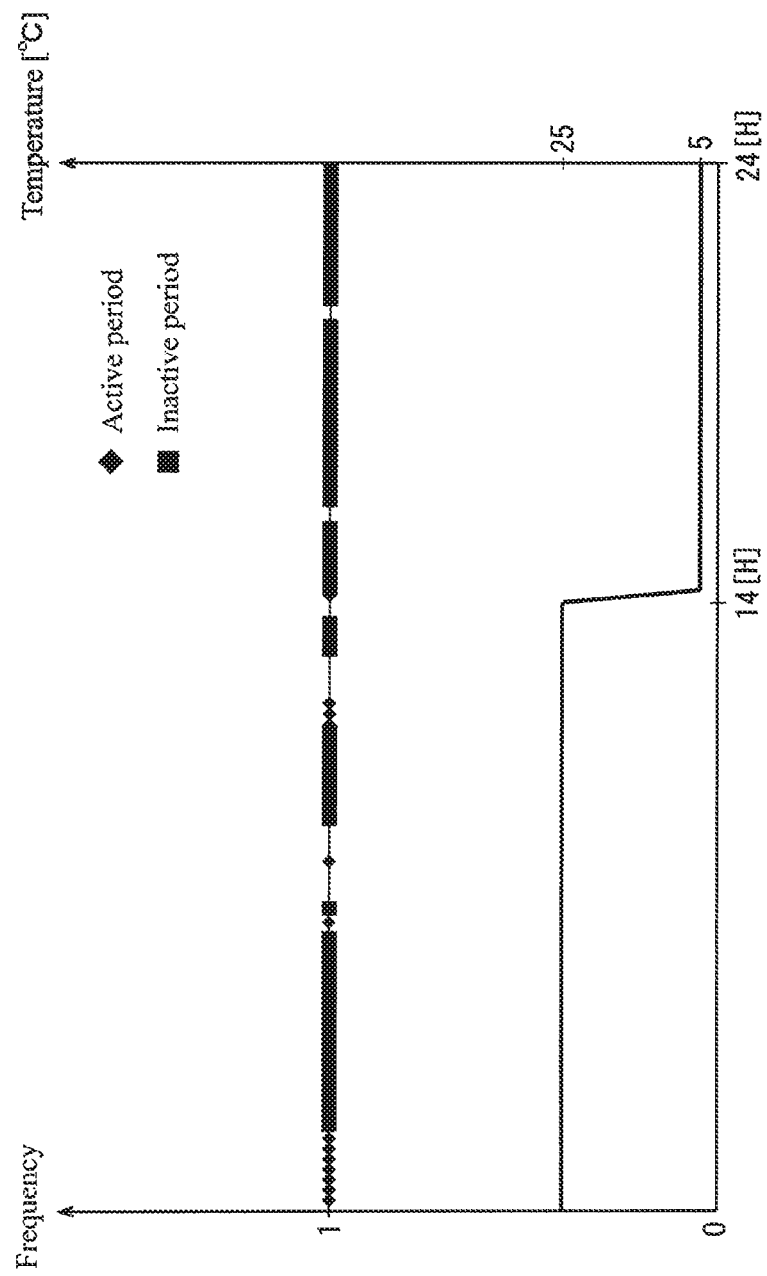
FIG. 10 illustrates an alternative example of output of the analyzing of the system in FIG. 1.

FIG. 10 illustrates an alternative example of output of the analyzing of the system in FIG. 1, the x-axis represents time axis, the right-side y-axis represents temperature, and the left-side y-axis represents appearance of the frequencies counted in the case where the variation width of the measurement value in FIG. 9 is equal to or greater than the threshold for judging the active period and is equal to or smaller than the threshold for judging the inactive period.

According to the graph of FIG. 10, also, each the diamond mark represents the frequency of the active period, each square mark represents the frequency of the inactive period, so that change of activity with time can be analyzed quantitatively. Furthermore, the number of the diamond marks counted until 14 hours after the experiment start was 18, the number of the diamond marks counted after 14 hours from the experiment start was 1, the number of the square marks counted until 14 hours after the experiment start was 29, the number of the square marks counted after 14 hours from the experiment start was 42, from the results, the number of appearance of the square marks per 1 hour was 2.1 before 14 hours, after 14 hours, the number became 4.2, it became twice, so that the judgement is conducted that the animal was in not rest but hibernation due to the sudden drop of temperature.

Effects of the observation system 1 of animal behavior are explained. Preparing a dedicated animal container 3 where the animal move around, obtaining the measurement data by the balance 2 while relieving the animal on the animal container 3, and constantly recording the measurement value based on the measurement data in the recording unit 34 are conducted. When the animal acted, thus, when a movement of the center of gravity was generated, the movement appears as a change of the measurement value (displayed value). In a state where the animal acted livelily, the measurement value changed dramatically, in a state where the animal acted negatively at a constant position, change of the measurement value was detected as slight amount. Outputting this recording of the change of the measurement value along a time axis on the output unit 34, within a predetermined period in accordance with the object of the experiment, enables observation of the animal behavior as shown in FIG. 5.

Furthermore, preparing the disturbance generating apparatus 6 which give a disturbance to the animal on the animal container 3 enables observation of both of the change of the measurement value and time of the disturbance occurrence, so that how the animal behavior changes due to the disturbance can be analyzed. The disturbance described above includes light emitting/blocking, liquid ejecting, electric stimulation, odor generating, sound, vibration, object touching, water serving, and feeding, and any factors enabling entrance of a sensibility sensor of the animal.

Calculating the variation width of the measurement value per unit of time enables analysis of an activity state of the animals based on a dimension of the variation width as shown in steps S3 to S5 in FIG. 7.

Counting the frequency which the variation width is equal to or greater than the set threshold enables analysis of an activity-state pattern of the animal based on the frequency as shown in steps S6 to S8 in FIG. 7.

In this manner, the observation system 1 of animal behavior enables observation and analysis of animal behavior instead of an observation using a camera. Especially, in an experiment conducted at a place beyond eyeshot or a place to avoid light throwing, also, regarding a weight change due to a slight action which cannot recognize visually, the system enables observation and analysis of the animal behavior more detail by utilizing a balance with high resolution measurement performance.

Also, the system enables analysis with more precision because a data processing necessary for digitization is easy in comparison to a method utilizing a camera.

The observation system 1 of animal behavior can be configured with a balance 2 or arithmetic processing device 4 which are an experimentalist's possession or widely circulated, so that the system can be installed easily and inexpensively.

In addition, in the observation system 1 of animal behavior, change of measurement value due to a movement (movement of the center of gravity) on the animal container 3 is a basis, so that a weight measuring apparatus enables detection of the movement with high sensitivity is preferable. As the weight measuring apparatus, a strain gage type or an electrostatic capacity type weight measuring apparatus may be used, however, in view of the high sensitivity and high response speed, an electromagnetic balance type electronic balance is preferable.

The performance of the balance 2 is determined as follows. Considering an instability of the measurement value due to a fluctuation of the center of gravity (fluctuation) based on the fact that a human having a weight of 60 [kg] has a fluctuation of the center of gravity of 1 to 10 [g] in a stasis condition and defining the fluctuation of the center of gravity as a movement of the center of gravity, when a mouse having a weight of 30[g] is observed, the movement of the center of gravity x is calculated from the proportional expression: 60000 [g]: 10 [g]=30 [g]: x [g], as x=5 [g]. Thus, it can be determined that use of a balance with a weighing capacity of 3 [kg] and a minimum display unit of 1 to 10 [mg] is preferable.

Preferred embodiments of the present invention are described above with reference to the drawings, these specific configurations are not limited to the embodiments, and a modification in accordance with the aim of the present invention is included in the present invention.

REFERENCE NUMBER LIST

1 Observation system of animal behavior
2 Balance
3 Animal container
4 Arithmetic processing device
5 Environment sensor unit
6 Disturbance generating apparatus
32 Analyzing unit
33 Recording unit
34 Output unit

The invention claimed is:

1. An observation system of animal behavior, comprising:
an animal container having an area in which an animal can move around and outer walls formed on an outer periphery of the area so as to prevent the animal escaping from the animal container;
a weight measuring apparatus that has a weight detecting unit configured to obtain measurement data of the animal in the animal container;
an analyzing device enabling calculation of a measurement value in accordance with the measurement data;
a recording device that constantly stores the measurement value; and
an output device that outputs the measurement value along a time axis,
wherein the analyzing device calculates a variation width of the measurement value per unit time and conducts at least one judgment as follows:
when the variation width for a period is greater than a threshold for judging an active period, the period is judged as an active period,
when the variation width for the period is smaller than a threshold for judging an inactive period, the period is judged as an inactive period.

2. The observation system of animal behavior according to claim 1, wherein the observation system further comprises a disturbance generating device that subjects the animal to a disturbance in the animal container.

3. The observation system of animal behavior according to claim 1, wherein an environmental sensor for measuring observation environment is disposed inside, outside, or around the animal container, the recording device constantly stores the measurement value and an environmental value of the environmental sensor, and the output device outputs the measurement value with the environmental value along a time axis.

4. The observation system of animal behavior according to claim 1, wherein the analyzing device counts a frequency that the variation width is equal to or greater than a set threshold, and conducts at least one judgment as follows,
when the frequency is above a predetermined high level, the analyzing device judges that an excitement state has occurred, and
when the frequency is below a predetermined low level, the analyzing device judges that an immotile state has occurred.

5. The observation system of animal behavior according to claim 1, wherein an environmental sensor for measuring an environmental value of an observation environment is disposed inside, outside, or around the animal container, and the recording device stores the variation width of the measurement value, and the output device outputs the variation width with the environmental value along a time axis.

6. The observation system of animal behavior according to claim 4, wherein an environmental sensor for measuring an environmental value of an observation environment is disposed inside, outside, or around the animal container, and
the recording device stores the frequency of the variation width of the measurement value, and the output device outputs the frequency with the environmental value along a time axis.

\* \* \* \* \*